US008141048B2

(12) United States Patent
Baumgartner et al.

(10) Patent No.: US 8,141,048 B2
(45) Date of Patent: Mar. 20, 2012

(54) SEQUENTIAL ENCODING FOR RELATIONAL ANALYSIS (SERA) OF A SOFTWARE MODEL

(75) Inventors: Jason R. Baumgartner, Austin, TX (US); Ali S. El-Zein, Austin, TX (US); Viresh Paruthi, Austin, TX (US); Fadi A. Zaraket, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1367 days.

(21) Appl. No.: 11/677,652

(22) Filed: Feb. 22, 2007

(65) Prior Publication Data

US 2008/0209389 A1 Aug. 28, 2008

(51) Int. Cl.
*G06F 9/44* (2006.01)
*G06F 9/455* (2006.01)

(52) U.S. Cl. .................. 717/126; 717/104; 716/106

(58) Field of Classification Search .................. 717/104, 717/126; 716/106
See application file for complete search history.

(56) References Cited

U.S. PATENT DOCUMENTS

2007/0157132 A1* 7/2007 Cheng et al. ............. 716/3

OTHER PUBLICATIONS

Zaraket F, Aziz A and Khurshid S. "Applying a Sequential Circuit Solver to Alloy" Nov. 6, 2006. In ACM SIGSOFT First Alloy Workshop, Portland, Oregon. D Jackson and P Zave, Editors. pp. 1-9.*
De Micheli, G. "Hardware Synthesis from C/C++ Models," in Design Automation and Test in Europe, Proceedings, Mar. 1999. Retrieved from IEEE Xplore on Mar. 10, 2011.*
Emina Torlak & Greg Dennis;"Kodkod for Alloy Users", Massachusetts Institute of Technology Computer Science and Artificial Intelligence Laboratory, Cambridge, MA 02139; First Alloy Workshop; Nov. 2006; 5 pgs.
Sarfraz Khurshid & Daniel Jackson; "Exploring the Design of an Intentional Naming Scheme with an Automatic Constraint Analyzer"; Laboratory of Computer Science, Massachusetts Institute of Technology, Cambridge, MA 02139; 2000; 10 pgs.
Ilya A Shlyakhter; "Declarative Symbolic Pure-Logic Model Checking"; Submitted to the Department of Electrical Engineering and Computer Science, Massachusetts Institute of Technology; Feb. 2005; 181 pgs.
Steven A. Edwards; "The Challenges of Hardware Synthesis from C-like Languages"; pp. 66-67, vol. 1; Mar. 7-11, 2005; Department of Computer Science, Columbia University, New York (ISSN: 1530-1591).
Fadi Zaraket et al.; "Sequential Circuits for Relational Analysis"; pp. 13-22; May 20-26, 2007; IBM Systems & Technology Group, Armonk, NY (ISSN : 0270-5257).
J.R. Burch et al.; Symbolic Model Checking: $10^{20}$ States and Beyond; pp. 1-33; Jun. 4-7, 1990; School of Computer Science Carnegie Mellon University, Pittsburgh, PA.
Daniel Jackson; "Automating First-Order Relational Logic"; 11 pages; vol. 25; Nov. 6, 2000 Laboratory of Computer Science Massachusetts Institute of Technology.

* cited by examiner

*Primary Examiner* — Li Zhen
*Assistant Examiner* — Erika Kretzmer
(74) *Attorney, Agent, or Firm* — Yudell Isidore Ng Russell PLLC

(57) ABSTRACT

A method of verifying a software system includes receiving a description of a software system described utilizing a high-level modeling language, and responsive thereto, parsing the description and constructing an abstract syntax graph. The abstract syntax graph is transformed into a sequential logic representation of the software system. The sequential logic representation is formed by reference to a Hardware Description Language (HDL) library. Then, the sequential logic representation is transformed into a gate-level sequential logic representation. Following the transforming, the software system is verified based upon the gate-level sequential logic representation. Following verification, results of verification of the software system are output.

21 Claims, 6 Drawing Sheets

SEQUENTIAL ENCODING FOR RELATIONAL ANALYSIS (SERA) OF A SOFTWARE MODEL

BACKGROUND OF THE INVENTION

1. Technical Field

The present invention relates in general to data processing and, in particular, to software modeling.

2. Description of the Related Art

As software systems steadily grow in complexity and size, designing software systems manually becomes more and more error-prone. Recently, a new generation of lightweight software design tools has been developed that supports the formulation of software designs formally and the checking of the designs for correctness. The ALLOY™ tool-set, which was developed at Massachusetts Institute of Technology (MIT) by the Software Design Group, is one such design tool that is rapidly gaining prominence. With this tool-set, a system, such as a software system, is described in the ALLOY modeling language and then analyzed utilizing the ALLOY Analyzer. The ALLOY Analyzer 4.0, an accompanying tutorial, and related materials are freely available for download from the Alloy web site hosted by MIT (alloy dot mit dot edu).

ALLOY™ is a first-order relational modeling language with transitive closure and is particularly suited for expressing integrity properties of structurally complex data that arise in various contexts. ALLOY formulas describe infinite software designs and specifications and are undecidable. To make ALLOY formulas amenable to automated analysis, such as generation of instances of invariants, simulation of execution, and checking user-specified properties of a model, the ALLOY Analyzer finitizes the models using a scope as an upper bound on the cardinality of sets of typed objects. Analyses based on fnitization are inspired by the small scope hypothesis, which observes that many errors can be detected using small configurations, even in the case of large software systems. The ALLOY Analyzer encodes relations between objects as bit-matrices of atomic propositions with true and false values. The ALLOY Analyzer then formalizes the specification in question as a pure combinational Boolean predicate. The ALLOY Analyzer expresses the predicate in conjunctive normal form (CNF) and then decides its validity using an off-the-shelf satisfiability (SAT) solver.

SAT solvers often face an exponential expansion (often called "blow up") in the number of possible assignments to the atomic propositions. This problem, known as state explosion, along with the large number of variables used in the CNF encoding, often limits the SAT-based ALLOY analysis to scopes below 10, rendering such analysis inapplicable to complex real-world designs.

SUMMARY OF THE INVENTION

In view of the foregoing and other shortcomings of conventional techniques of software modeling, the present invention provides improved methods, systems and program products for verifying a software model of a system.

In accordance with one embodiment, a method of verifying a system includes receiving a description of a system described utilizing a high-level modeling language, and responsive thereto, parsing the description and constructing an abstract syntax graph. The abstract syntax graph is transformed into a sequential logic representation of the system, and following the transforming, the system is verified based upon the sequential logic representation. Following verification, results of verification of the system are output.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

DETAILED DESCRIPTION OF ILLUSTRATIVE EMBODIMENT

The present invention recognizes that conventional modeling tools, such as the ALLOY Analyzer, often fail to produce the conventional conjunctive normal form (CNF) formula due to the large number of variables needed. For example, for an undirected 7-node tree the translation into CNF generates a formula with over 1 million variables and 5 million clauses. The large number of variables and the large number of CNF clauses presented to the decision algorithms also frequently prevent arrival at a conclusive result. Because CNF encoding of a software model is inherently restricted to the use of reduction techniques that can be applied to combinational formulae such as symmetry breaking, redundancy removal, and re-parameterization, the limitations of CNF encoding attributable to the large number of required variables cannot easily be overcome.

In view of the inherent limitations of the conventional CNF encoding for modeling formulas, the present invention instead employs sequential logic to encode modeling formulas. As a result, an arsenal of powerful sequential simplification techniques such as retiming, target enlargement, localization abstraction, state equivalence minimization, bounded-model checking, and semi-formal search can be applied singly, in combination, and/or iteratively to substantially simplify the sequential logic, thus rending the sequential logic decidable at substantial scopes.

Figure 1:
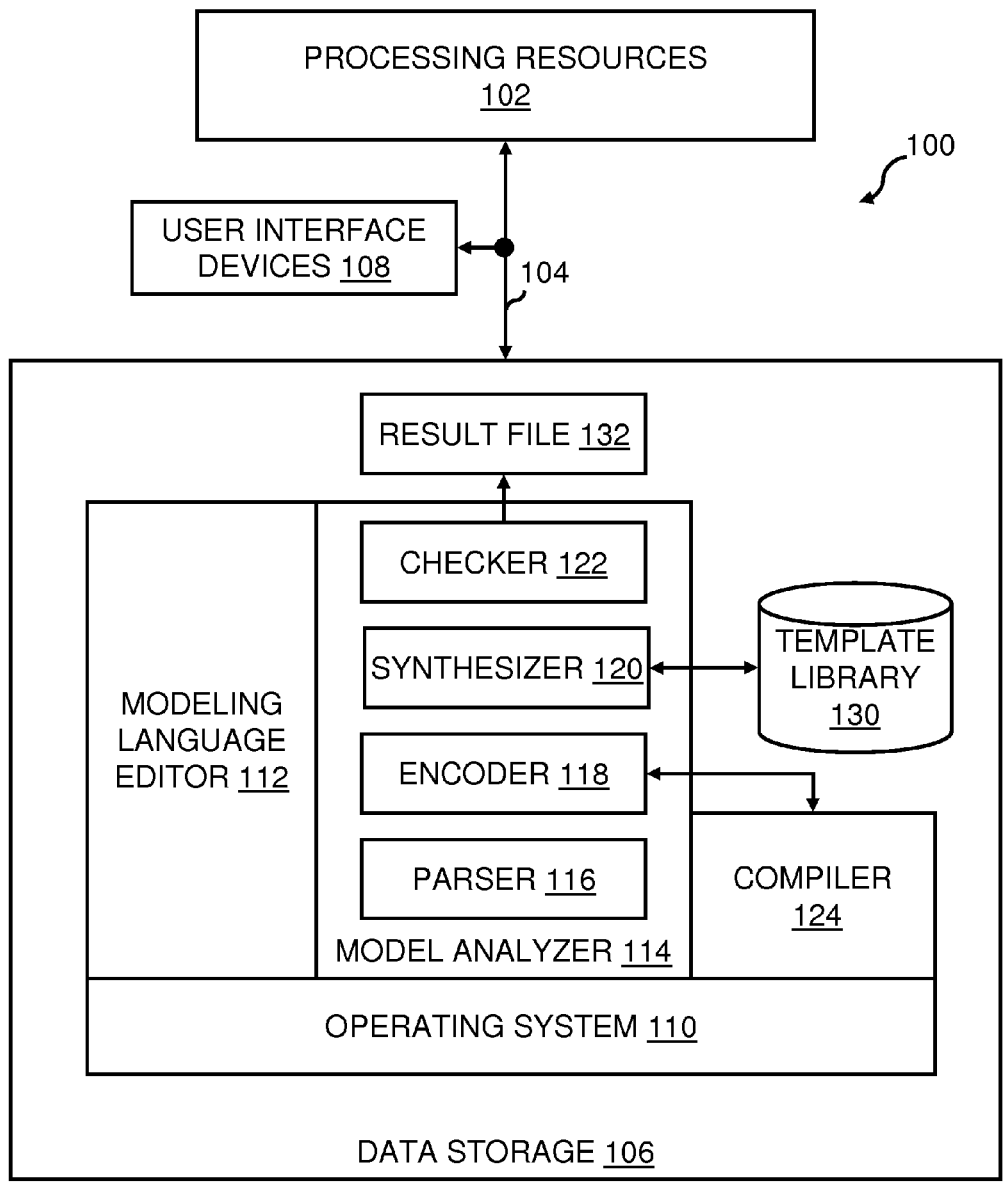
FIG. 1 is a high level block diagram of a data processing system in accordance with the present invention.

With reference to the figures and in particular with reference to FIG. 1, there is illustrated a block diagram of an exemplary data processing system 100 in accordance with the present invention. As depicted, data processing system 100 includes processing resources 102, which may comprise one or more physical processors. Processing resources 102 are coupled via a communication fabric 104 (e.g., a bus, switch, and/or wired or wireless communication network) to local and/or remote data storage 106 to permit processing resources 102 to access and execute the program code stored therein. As depicted, the program code residing in data storage 106 includes an operating system 110, which may be implemented with a conventional operating system such as LINUX, AIX, or WINDOWS. In addition, the program code includes a modeling language editor 112, which permits a user to describe a model of a system (e.g., a software system) in a structural modeling language that is currently known or hereafter developed utilizing user interface devices 108 such as a display, keyboard, and pointing device. For example, in one preferred embodiment, the modeling language may be the ALLOY modeling language described above.

The program code within data storage 106 further includes a model analyzer 114 that, given a description of a system in the modeling language supported by modeling language editor 112, attempts to verify the system. Model analyzer 114 differs from known model analyzers such as the ALLOY Analyzer (developed by the Software Design Group) in that, given a formula Phi (also expressed as $\Psi$) with a scope n, model analyzer 114 performs its analysis utilizing sequential logic SERA(Phi, n) to represent nodes in the abstract syntax graph for the formula Phi. In at least some embodiments, model analyzer 114 has an associated Hardware Description Language (HDL) template library 130 within data storage 106 that facilitates the composition of the sequential logic into a netlist, as described further below. The results of the verification performed by model analyzer 114 are presented in a result file 132, whose contents may further be displayed in a display device among user interface devices 108. As shown, the functions of model analyzer 114 may be realized as a parser 116, encoder 118, synthesizer 120 and a checker 122, each of which is described in detail below. Model analyzer 114 may additionally make calls to other program code, such as compiler 124 in order to facilitate its analysis of a formula Phi, as discussed further below with reference to FIG. 2A.

Figure 2A:
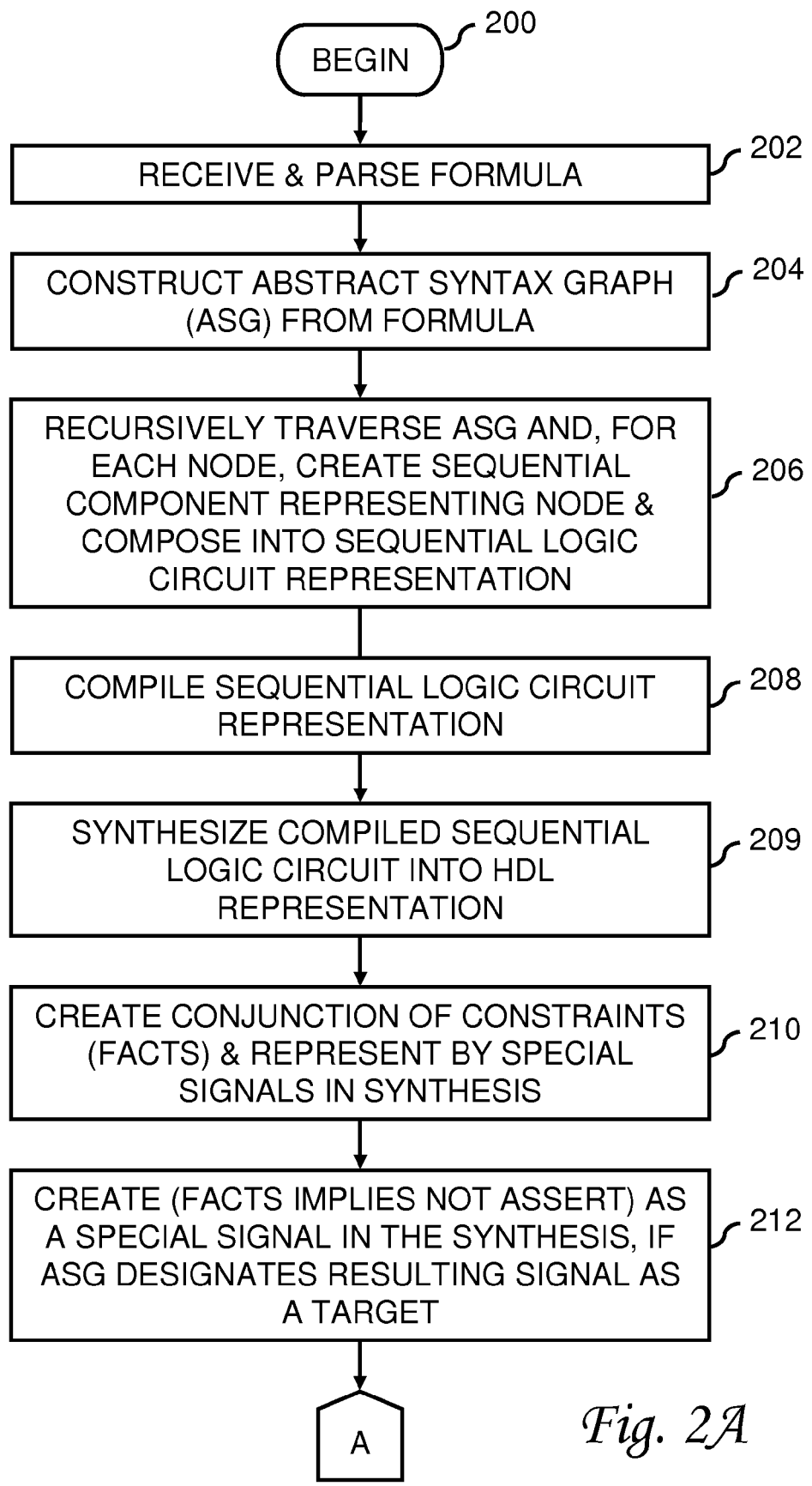
FIGS. 2A-2B together form a high level logical flowchart of an exemplary method of processing a formula describing a system in accordance with the present invention.
Figure 2B:
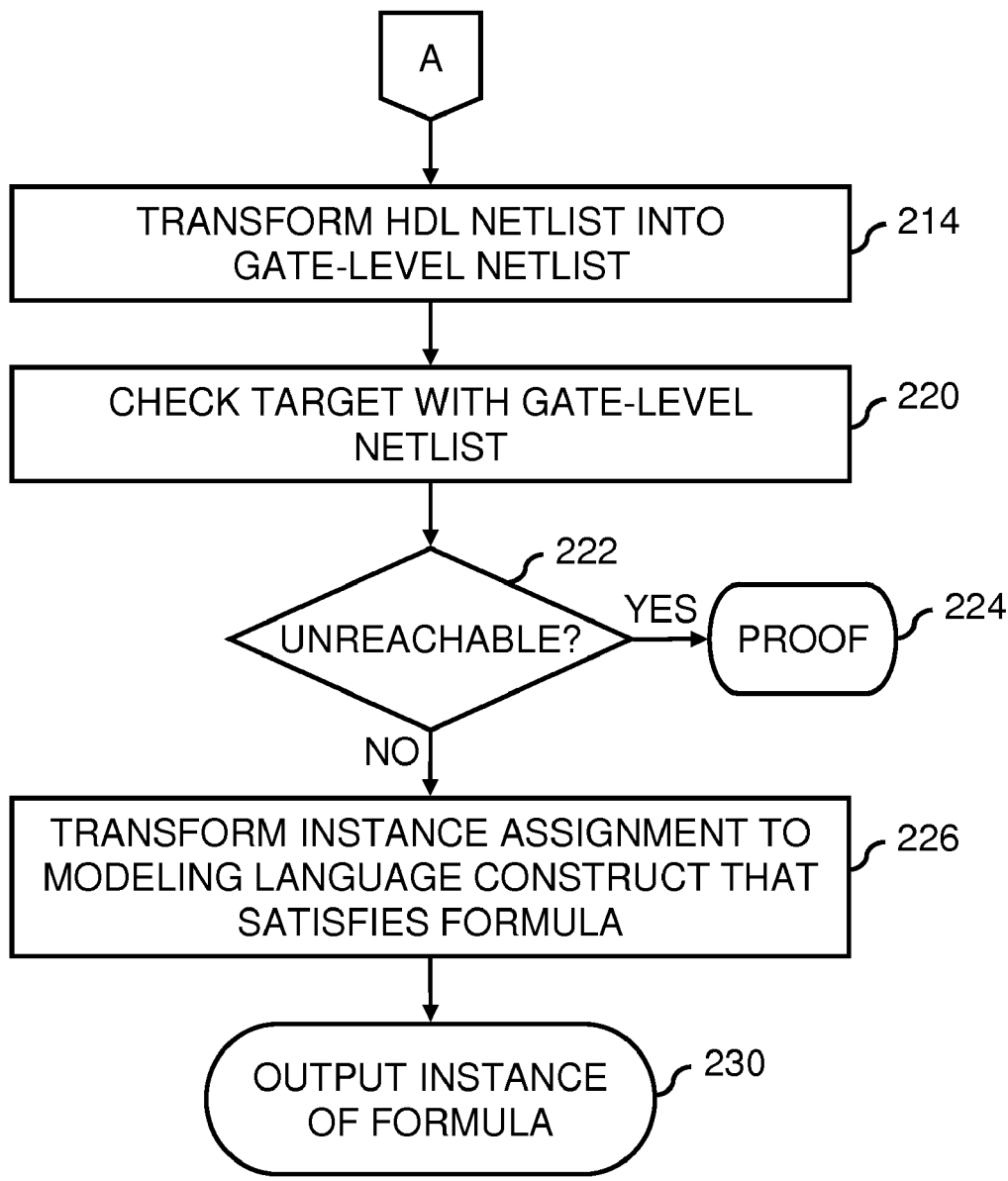

Referring now to FIG. 2A-2B, there is depicted a high level logical flowchart of a method of processing performed by a model analyzer 114 in accordance with the present invention. The process begins in FIG. 2A at block 200 and thereafter proceeds to block 202, which depicts parser 116 of model analyzer 114 receiving an input formula Phi ($\Psi$) described in a modeling language, such as that supported by modeling language editor 112. Formula Phi may describe any arbitrary system, such as a real world scheduling problem, the operation of a software system (e.g., one or more application, middleware or operating system programs), a business process, etc. In response to receipt of formula Phi, parser 116 of model analyzer 114 parses formula Phi to obtain a parse tree.

Next, at block 204, parser 116 of model analyzer 114 constructs from the parse tree an abstract syntax graph (ASG) of the formula Phi received at block 202. An ASG is a finite, labeled, undirected graph, where the internal nodes are labeled by operators, and the leaf nodes are NULL operators representing the operands (i.e., variables or constants) of the operators. Unlike a conventional abstract syntax tree (AST), the ASG is not constrained to have a single root node (i.e., adhere to a tree form) and further can represent multiple operators or operands with a single node, meaning that in the ASG a node may have links to multiple nodes nearer to (or at) the root node(s).

The process then proceeds from block 204 to block 206, which represents encoder 118 of model analyzer 114 recursively traversing the ASG, creating a sequential logic component (referred to herein as a Sequential Encoding for Relational Analysis (SERA) component) representing each node of the ASG and composing the sequential logic components into an overall sequential logic circuit representation.

Figure 3:
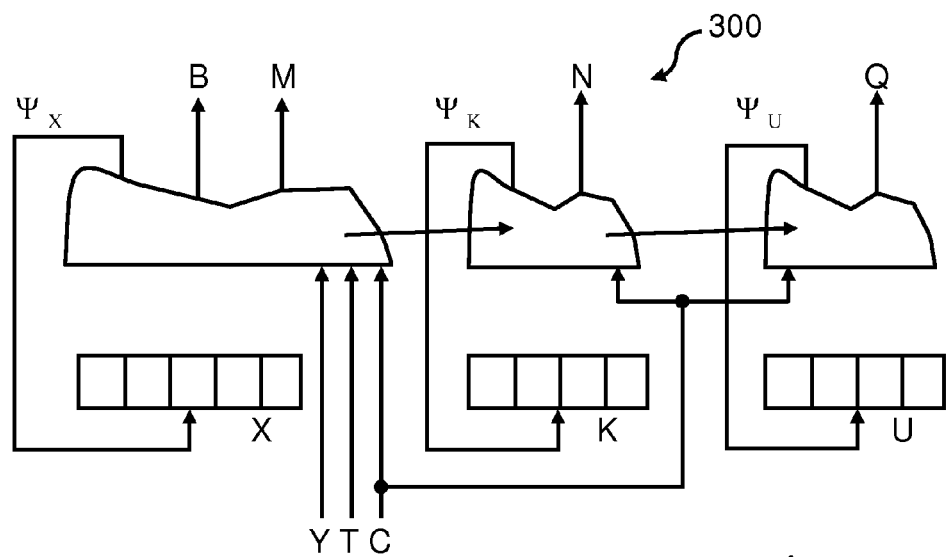
FIG. 3 depicts a prototypical Sequential Analysis for Relational Encoding (SERA) logic component in accordance with the present invention.

With reference now to FIG. 3, there is depicted a graphical representation of a prototypical SERA component 300 generated by encoder 118 of model analyzer 114 for a formula Phi ($\Psi$) having a set of input variable I and a set of output variables O. As shown, encoder 118 of model analyzer 114 partitions the set of input variables I into three subsets, namely, Y, T and C, and partitions the set of outputs O into four subsets, namely, B, M, N and Q. Encoder 118 of model analyzer 114 may further create a set of registers R partitioned into three sets, namely, X, K and U. Depending on the formula Phi, some of these sets may be empty.

The set of primary inputs in C includes an input that is used to initialize registers X, K and U, if necessary, and an input that is used to begin execution of SERA component 300. The T inputs include relation and set data passed from other SERA components 300, if any. The Q outputs signal other SERA components 300, if any, for more data, if needed, or that computation by SERA component 300 has completed.

Component 300 uses the register sets X, K, and U to store its membership, cardinality and validity state, respectively. Component 300 updates registers X, K and U through the next-state function, which maps a state and an input valuation to a next-state and is decomposed into functions Phi_X ($\Psi_X$), Phi_K ($\Psi_K$) and Phi_U ($\Psi_U$). The output sets M, N and B return membership, cardinality and predicate information; the environment of SERA component 300 signals queries on membership and cardinality through the index inputs Y and control inputs C. For example, a SERA component 300 corresponding to a set asserts whether the element whose index is encoded by the input in Y belongs to the set or not via output set M.

Encoder 118 generates the set of input variables, the set of output variables, and the register set through predefined mappings for constructs in the selected modeling language. To enhance understanding of this mapping processing, the process of creating SERA components 300 depicted at block 206 of FIG. 2A will now be described with reference to a preferred embodiment in which formula Phi is expressed in ALLOY. When processing an ALLOY formula Phi with scope n at block 206, encoder 118 of model analyzer 114 recursively traverses the abstract syntax graph from its command to its Sigs and implicit relations. For each ALLOY construct, encoder 118 of model analyzer 114 instantiates its corresponding logic as summarized below in Table I. Table I details the membership, cardinality and predicate functions and the interesting connections of logic components corresponding to various different ALLOY constructs. Table I further shows the number of steps and variables needed for the computation to complete as a function of the scope n and the highest arity of a relation k.

TABLE I

| ALLOY construct | Membership | Cardinality | Validity | Variables |
|---|---|---|---|---|
| Sig | M = R[Y] | N = priority (R) | 0, 0 | N |
| Relation | M = R[Y] | countOnes(R) | 0, 0 | $n^K$ |

TABLE I-continued

| ALLOY construct | Membership | Cardinality | Validity | Variables |
|---|---|---|---|---|
| $A \cup B$ | $M = M_A \vee M_B$ | $\Psi_K = K + \text{countOnes}(i)$ | 1, n | lg(n) |
| $A \cap B$ | $M = M_A \wedge M_B$ | $\Psi_K = K + \text{countOnes}(i)$ | 1, n | lg(n) |
| $A \backslash B$ | $M = M_A \wedge \neg M_B$ | $\Psi_K = K + \text{countOnes}(i)$ | 1, n | lg(n) |
| $\neg A$ | $M = \neg M_A$ | $N = |U_A| - |A|$ | 1, 1 | Constant |
| $\sim A$ | $M = M_{A \mid Y - (Y[k], Y[j], Y[i])}$ | $|A|$ | 0, 0 | Constant |
| A.B | $M = M_{B \mid Y - (T_A, Y)}$ | $\Psi_K = K + \text{priority}(A)$ | n, n | lg(n) |
| ʌA | $M = R[Y], S_o = R_A$ $\Psi_{Ri+1} = (R_i : R_i) \cup R_i$ | $\Psi_K = K + \text{priority}(Ri)$ | n, lg(n) | n lg(n) |
| $v \in V \mid F$ | $M(a \in V) = F\|_{v-a}$ | $\Psi_K = K + \text{countOnes}(i)$ Predicate | 1, n | lg(n) |
| $\forall v \in V \mid F$ | $\Psi_B = B \wedge F\|_{v - v[i]}$ | | 1 | n lg(n) |
| $\exists v \in V \mid F$ | $\Psi_B = B \wedge F\|_{v - v[i]}$ | | 1 | n lg(n) |

In instantiating logic in accordance with Table I, encoder 118 of model analyzer 114 composes each structure into the desired sequential logic, termed SERA(Phi, n), connecting the validity outputs to the initialization and execution inputs and connecting the index outputs to the query inputs. Finally, encoder 118 of model analyzer 114 designates the conjunction of the predicate output that corresponds to the asserted command, the constraints, and their validity outputs as the target of the sequential logic.

The leaf nodes of the abstract syntax graph (ASG) of an ALLOY formula are Sigs and implicit relations and constitute the base case for the SERA(Phi, n) recursion. Their primary inputs are the unconstrained primary inputs of the final circuit, thereby allowing all possible models within the scope. To represent membership, the initial value nodes for the registers in X are connected to primary inputs. Consequently, if the i-th bit in the range of Sig A is set to 1, then the i-th object exists. Without loss of generality, the set-bits are required to appear before the off-bits within a given range. This allows us to trivially implement cardinality by a priority encoder and membership by checking whether an index is smaller than the cardinality. As shown in the first and second rows of Table I, in general, n to the power k variables are required to represent implicit relations, where k is the arity of the relation.

In a tradeoff between the sequential depth and the number of variables, n multiple accesses to the membership functions are allowed. This requires an additional lg(n) bookkeeping variables in U and n more indexing wires in Y, but keeps the sequential depth of all components linear in n. The countOnes function counts the number of matches in multiple membership checks to return the cardinality of the relation. The priority function implements the priority encoder to return the cardinality of the set. Membership and cardinality of Sigs and implicit relations depend only on the initial values, and are immediately valid as shown in the validity column in Table I. The validity output Q of one component is connected to the execute control input in C of the next component in the hierarchy.

The internal nodes of an abstract syntax graph for an ALLOY formula correspond to a variety of logical and relational operations, including propositional connectives, quantifiers, relational product, transitive closure, set operations, and arithmetical predicates. Once SERA components are generated for all subnodes of the internal nodes, encoder 118 of model analyzer 114 then builds the SERA component for each such internal node. In doing so, encoder 118 of model analyzer 114 encodes each propositional operator (and, or, not, implies, iff) with a combinational circuit and connects B with the corresponding connective to the predicate outputs of the operand components. Encoder 118 of model analyzer 114 also connects Q to a conjunction of the validity outputs of the operand components.

Because the scope is finite, encoder 118 of model analyzer 114 is able to easily perform quantifier elimination. The universal quantification of Theta by x is replaced by the conjunction of Theta restricted to each value x can take; for existential quantification, conjunction is replaced by disjunction. The SERA component computes conjunction and disjunction sequentially, and employs an early termination mechanism that terminates computation when the first false or first true value, respectively, is reached. This each termination mechanism provides a significant advantage since quantification can be aborted before computation for the whole domain. The quantification component preferably employs a counter to index the components embedded in its formula through their Y inputs, holds the current index, and accumulates a valid bit and an output bit. Evaluation is performed when the valid bit indicates the quantification is complete.

The relational product of two components A and B is implemented by a component that fills in the index Y_B of the queried component B by the concatenation of tuples from the left operand A and the actual argument Y to the relational product component. All the matches are saved in registers, which are reserved for this purpose, and then produced sequentially, one after the other, while updating the cardinality count and setting the validity bits. The cardinality is computed using a priority encoder over the matches for the concatenated index. Since n parallel membership checks are supported, the validity of the membership and cardinality data can be guaranteed in at most n steps.

Encoder 118 of model analyzer 114 preferably defines a unique variable order to respect the order in which Sigs are declared in formula Phi, and thereafter exploits that order to trivialize type-determination functions. As a result, the transpose operator may produce a result that conflicts with the unique variable order. Encoder 118 of model analyzer 114 attempts to rewrite formula Phi to normalize transposition. In cases of conflict, such as the UndirectedGraph constraint E=–E, or in cases of obvious sub-optimality introduced in the variable ordering, encoder 118 of model analyzer 114 resorts to adding a redundant variable appropriately. Such substitutions are shown in the seventh row of Table I. Encoder 118 of model analyzer 114 also adds a constraint that indicates the equivalence of the redundant data so that redundancy removal techniques can easily exploit the hint.

Transitive closure in ALLOY repeats one or more relational product (composition) infinitely many times. Encoder 118 of model analyzer 114 encodes the transitive closure of each relational product using iterative squaring, as detailed in the ninth row of Table I. By doing so, only n×lg(n) variables are used, and computation converges within lg(n) steps. Due to the ALLOY context-based type system, multiple compositions may need to be applied.

As shown in third through sixth rows of Table I, encoder 118 of model analyzer 114 encodes the membership function and its validity as combinational functions of the membership and validity of the operand components. The cardinality and the subset check require n steps to converge. In a sequential run of a union or an intersection, duplicates can easily be eliminated by relaxing one of the indexes of the operand components. The SERA component iterates the execution of the countOnes function with the indexes, resulting in true and valid membership outputs from the operand components.

Another source for Boolean values in ALLOY is integer arithmetic comparisons, which may involve cardinality values. The ALLOY Analyzer uses the scope to allocate a finite number of integers to model the integer space and simplify the arithmetic predicates. Encoder 118 of model analyzer 114, in contrast, encodes arithmetic operators with combinational circuits and a valid state bit that propagates the validity bits of the operand components. Note that all integer valuations, less the cardinality values, are considered valid by default.

Without loss of generality, encoder 118 of model analyzer 114 preferably implements the same scope value for all Sigs, thereby permitting type-determination to be as simple as checking whether or not an index lies within a range. Counters embedded in all SERA components are also preferably simplified by restricting the scope to be a power of two. With this restriction, counters are allowed to start at any state and terminate when the initial state is again reached. The SERA component can then designate the counter cycle state as its idle state, and the type-determination of a certain index is now simplified to an appropriate shift operation. In most cases some SERA components are guaranteed to finish their production before other components even begin. This fact can be leveraged to allow memory sharing between non-overlapping components. Note also that encoder 118 of model analyzer 114 separates variables based on the functions for which they are used, allowing significant cone of influence reductions if, for example, the cardinality of a components is not checked. Furthermore, the separation of variables in this manner introduces redundancy, which can be exploited by redundancy removal transforms as described below.

For ease of exposition, an exemplary implementation of SERA components 300 will now be described using C++ classes and objects, with access modifiers and trivial constructors being omitted. The abstract class Component given below describes an exemplary generic interface of all SERA components 300.

```
class Component:public Thread{
public:
    bool predicate( );
    bool in(iter u);
    bool in(iter u,iter v);
    int card( );
    bool memberValid( );
    bool cardValid( );
    bool predValid( );
    void evaluate( );
    void terminate( );
    void initialState( );
    void nextState( );
    int depth( );};
```

Component inherits from Thread to denote that all components run concurrently and its member function nextState is the thread's entry point.

Encoder 118 of model analyzer 114 aggregates all of the SERA components 300 into a top-level sequential logic component compVec corresponding to the formula Phi as follows:

```
vector<Component> compVec;
bool circuit( ) {
    int depth = 0;
    for(int i=0; i<compVec.size( ); i++)
        compVec[i].initialState( );
    while( (!compVec[0].predValid( )) &&
            (depth++ < compVec[0].depth( ))) {
        // run all threads concurrently
        for( int j=0; j<compVec.size( ); j++)
            compVec[j].nextState( );
        waitForAllThreads( );}
    return compVec[0].pred( );};
```

In this top-level component compVec, the while loop models time, where each iteration is a step and the number of steps required for the loop to terminate is the depth of the circuit. The function circuit makes calls to all nextState functions synchronously at every step. Within the function circuit, the for loop spawns all the threads concurrently. The function circuit then waits for all nextState calls to finish. The invariant check is the pred function of compVec[0], meaning that Phi will be satisfiable in scope n iff compVec[0].pred( ) returns true upon termination of circuit( ).

In the foregoing code, the functions in, card, and pred serve as output functions. Function in takes index arguments and returns whether the set or relation described by the component contains the variable or tuple denoted by the indices. Function card returns the cardinality of the set or the relation described by the component. Function pred returns the Boolean value of a predicate if the component corresponds to a Boolean expression. The functions memberValid, cardValid, and predValid are Boolean validity functions and their return values thus signal whether a value returned by the corresponding output function is valid or not. The component's computation is complete when its predValid function returns true. Depending on the ALLOY sub-formula the component corresponds to, some of these functions may never be invoked, and thus may be left unimplemented.

A SERA component 300 may contain one or more references to one or more other components. A function in a SERA component 300 uses the references to execute other SERA components 300 if their output functions are not yet valid and to query them once valid. The values of the other non-reference data elements of a SERA component 300 constitute its state at a specific step. The initialState function initializes the component to its initial state, and the nextState function updates the state. The evaluate and terminate functions are control functions that respectively start the execution of a SERA component 300 if it was not in a valid or running state and force it to stop execution if the top hierarchy does not need the result anymore.

The constructor of each SERA component 300 initializes its references appropriately and adds itself to the global vector of components compVec. Additional classes for each ALLOY construct in formula Phi (e.g., Sig, Relation, TClosure, Product, Belongs, ForAll, IntPlus, IntMinus, IntEqual, And, etc,) inherit from Component, and each implements the ALLOY construct its name suggests.

The leaf nodes of the ASG of an ALLOY formula are signatures and implicit relations and constitute the base case for the recursive construction. The class Sig can be realized as follows:

```
template<int scope>
class Sig:public Component{
    class iter{/*omitted details*/};
    int size
    bool in(iter v){
        return v < size;};
    int card( ) {
        return size;};
    bool memberValid( ) {
        return true;};
    bool cardValid( ){
        return true;};
    void initialState( ) {
        //non-deterministic choice
        size = choose( )%scope;};
    void nextState( ) {
        size = size;};
    int depth( ) {return 1;};};
```

The template class Sig takes a template parameter as its scope, and thus the scope is part of the structure of the class. The class Sig uses the return value of a nondeterministic function, choose, modulo its scope, to initialize its size. Without loss of generality, the size of the set is enough to represent it since its members are indexed arbitrarily and any set can be re-indexed appropriately. The functions card and in are valid immediately, and in returns true if the index is smaller than the size.

The template class Relation given as follows can be utilized to implement the binary implicit relations:

```
template<class Sig1, class Sig2>
class Relation:public Component{
    class iter{/*omitted details*/};
    Sig1 & V1;
    Sig2 & V2;
    bitMatrix R[Sig1::scope]
              [Sig2::scope];
    bool in(iter v, iter u){
        return R[v][u];};
    int card( ){
        return countOnes(R);};
    bool memberValid( ){
        return true;};
    bool cardValid( ){
        return true;};
    void initialState( ){
        Sig1::iter u;
        Sig2::iter v;
        for(;u<V1.card( );u++)
            for(v.start( );v<V2.card( );v++)
                //non-deterministic choice
                R[u][v]=choose( )%2;
    void nextState( ){
        R = R;};
    int depth( ) {return 1;};};
```

The class Relation takes two set types, Sig1 and Sig2, as template parameters and references the two sets, V1 and V2, it relates. The class Relation uses the scope parameters of Sig1 and Sig2 to declare the bitMatrix R where it stores its membership state. The bit-matrix R is initialized nondeterministically modulo the cardinality of V1 and V2. The countOnes function returns the number of set bits in R to compute the cardinality of the relation. In a trade off between the depth of the circuit and the number of variables, n multiple accesses to the membership functions are allowed. Doing so requires an additional lg(n) bookkeeping variables and keeps the sequential depth of all components linear in n.

The internal nodes of an ALLOY formula's abstract syntax graph correspond to a variety of logical and relational operations, including propositional connectives, quantifiers, relational product, transitive closure, set operations, and arithmetical operators and predicates. A technique for building the SERA component 300 for each internal node is now discussed, assuming SERA components for all its sub-nodes are present.

Encoder 118 of model analyzer 114 encodes each propositional operator (and, or, not, implies, iff) with a combinational circuit component. The component holds references to its operand components and uses their pred and predValid functions. Following is a logically complete NAND component. As will be appreciated, the remainder of the possible logical operators can be described in terms of the NAND component.

```
class Nand:public Component{
    Component & F1, & F2;
    bool predicate( ){
        return !(F1.predicate( ) && F2.predicate( ));};
    bool predValid( ){
        return (F1.predValid( ) && !F1.predicate( ))||
               (F2.predValid( ) && !F2.predicate( ))||
               (F1.predValid( ) && F2.predValid( ));};
    int depth( ){
        return max(F1.depth( ), F2.depth( ));};};
```

Because the scope is finite, encoder 118 of model analyzer 114 can easily perform quantifier elimination. The universal quantification of Theta by x is replaced by the conjunction of Theta restricted to each value x can take; for existential quantification, conjunction is replaced by disjunction. The ForAll component shown below implements a universal quantifier:

```
template<class Sig>
class ForAll:public Component{
    Sig & V;
    Sig::iter & v;
    Component & F;
    bool value, valid;
    bool predicate( ) {
        return value;};
    bool predValid{
        return valid;};
    void initialState( ){
        value = true;
        valid = false;
        v = 0;};
    void nextState( ){
        if(!valid && v.isValid( )){
            if(F.predValid( )){value &= F.predicate( );
                if(v.isLast( )){valid == true; }
            if(!value){valid = true;
                F.terminate( );}
            v++;
            F.evaluate( );
        }}};
    int depth( ){
        return Sig::scope*F.depth( );
    };};
```

The class ForAll takes a set type Sig, a set V as its quantification domain, a reference to an iterator v as the quantified variable, and a reference to the formula component F. The class ForAll computes conjunction (disjunction) sequentially and employs an early termination mechanism where the first false (true) value terminates the computation. This mechanism provides a substantial advantage since we can abort the quantification without having to compute for the whole domain. The quantification component uses the v iterator to evaluate F, and accumulates its Boolean valid and value members.

The relational product of two components A and B is implemented by a component that fills in the index of the right operand B by the concatenation of tuples from the left operand A and the actual index argument to the relational product component. All the matches are saved in a bitMatrix, and then produced sequentially, one after the other, while updating the cardinality count and the validity bits. Since n parallel membership checks are supported, the validity of the membership and cardinality data is guaranteed in at most n steps.

In a preferred embodiment, a unique variable order is defined to respect the order in which signatures are declared in Phi, thus permitting type-determination functions to be trivialized. The transpose operator may produce a result which conflicts with the unique variable order. Encoder 118 of model analyzer 114 attempts to rewrite the formula in question to normalize transposition. In cases of conflict, such as the UndirectedGraph constraint E=~E, or in cases of suboptimality introduced in the variable ordering, encoder 118 resorts to adding a redundant variable appropriately. Encoder 114 also adds a constraint that indicates the equivalence of the redundant data so that logic optimization techniques can easily exploit the hint.

The transitive closure component can be realized as follows:

```
template<class S1, class S2>
class TClosure:public Relation{
    Relation<S1,S2> & T;
    bitMatrix E;
    bool valid;
    int count;
    bool in(S1::iter u,S2::iter v){
        return E[u][v];};
    int card( ){
        return countOnes(E);};
    bool memberValid( )
        {return valid;};
    Boolean cardValid( )
        {return valid;};
    void initialState( ){
        E = T.R;
        count = 0;
        valid = false;};
    void nextState( ){
        if((!valid) && T.cardValid( ) &&
        T.V1.cardValid( ) &&
        T.V2.cardValid( )){
            E = E*E + E;//iterative squaring
            if(count++ ==
                max(lg(T.V1.card( )),
                    lg(T.V2.card( )))
                    valid = true; } };
    int depth( ){
        int n=max(S1::scope, S2::scope);
        return lg(n)+T.depth( );};};
```

In contrast to transitive closure in ALLOY, which repeats one or more compositions infinitely many times, the TClosure template class given above takes two set types as template parameters and a reference to the component corresponding to the original binary relation. The nextState function encodes the transitive closure using iterative squaring, allowing the use of only n lg(n) variables and allowing the computation to complete within lg(n) steps.

The set union operator component can be realized as follows:

```
template<class S1, class S2>
class Union : public Component{
    class iter{/*omitted details*/};
    S1 & V1; S2 & V2;
    bool in(iter u){
        return V1.in(u) || V2.in(u);};
    int card( ){
        bitVector in;
        for(iter v;v.valid( );v++){
            in[v] = V1.in(v) || V2.in(v);};
        return countOnes(in); };
    bool memberValid( ){
        return V1.memberValid( ) &&
            V2.memberValid( );};
    bool cardValid( ){
        return memberValid( );};
    int depth( ){return
        max(V1.depth( ), V2.depth( ));};};
```

As shown above, the in and card functions and their validity can be encoded as a combination of the in and memberValid functions of the operand components. The Union class takes two set types and constructs its own appropriate iterator that maps indices correctly in case the types are different. The Union class also takes references to the components representing its operands. The card function inlines membership checks in both its operands and counts the matches in an intermediary bit vector. The rest of the set operators can be easily described in a similar fashion.

Another source for Boolean values in ALLOY is integer arithmetic comparisons, which may involve cardinality values. The prior art ALLOY Analyzer uses the scope to allocate a finite number of integers to model the integer space and simplify the arithmetic predicates. Encoder 114 encodes arithmetic operators with combinational circuit components in addition to validity propagation of the operand components. Note that all integer valuations, less the cardinality values, are considered valid by default.

Referring again to FIG. 2A, following the encoding performed at block 206, the process of FIG. 2A passes to block 208. Block 208 depicts encoder 118 of model analyzer 114 invoking compilation of the C++ representation of sequential logic circuit by compiler 124. Encoder 118 passes the scope n of formula Phi to compiler 124 as a parameter of the compilation to define the depth of the resultant sequential logic circuit. The C++ subset obtained from compilation, along with the implied concurrency semantics and the bounds on integers guaranteed by scope finitization, is then directly synthesized by synthesizer 120 into sequential circuits described in a Hardware Description Language (e.g., HDL) netlist, as described, for example, in G. DeMicheli, "Hardware Synthesis from C/C++ Models," *Design Automation and Test in Europe*, March 1999 and S. A. Edwards, "The Challenges of Hardware Synthesis from C-like Languages, *Design Automation and Test in Europe,* 2005 (block 209). To simplify generation of the HDL netlist, a generic parameterized SERA component for each of the possible modeling language constructs is preferably prestored as an HDL (e.g., Verilog HDL (VHDL)) template in HDL template library 130. A hierarchical HDL netlist with an asserted signal designated as the invariant is thus obtained from block 209.

The process proceeds from block 209 to block 210, which illustrates synthesizer 120 of model analyzer 114 creating a conjunction of all constraints (e.g., ALLOY "facts") within formula Phi and then representing the conjunction of the constraints using one or more special signals within the netlist. In a preferred embodiment, the processing of constraints following construction of the ASG as shown at block 210 permits a simpler netlist representation. As illustrated at block 212, if the ASG designates the resulting signal as a target, synthesizer 120 of model analyzer 114 also creates a special signal in the netlist synthesis to represent the relation:

facts implies not assert where implies is a logical operator specifying that all facts being true indicates the property is likewise true. It will be appreciated that this approach stands in contrast to the implementation of the ALLOY analyzer in which a property is checked for a counter example prior to checking the facts.

Following block 212, the process proceeds through page connector A to block 214 of FIG. 2B. Block 214 represents synthesizer 120 of model analyzer 114 transforming the HDL netlist composed at blocks 209, 210 and 212 into a gate-level netlist containing only AND gates, inverters and registers. Using this gate-level netlist, checker 122 of model analyzer 114 checks the target of formula Phi, as depicted at block 220. As will be appreciated, using conventional netlist reduction techniques, checker 122 of model analyzer 114 may also further simplify the netlist while checking the target. In response to a determination at block 222 that the target is unreachable, that is, that no counter example was obtained within the given scope, analysis by model analyzer 114 terminates at block 224 with checker 122 outputting an indication (e.g., to result file 132 and/or a display device among user interface devices 108) that proof of the formula was obtained. If, on the other hand, checker 122 of model analyzer 114 determines at block 222 that a counter example was identified, model analyzer 114 transforms the instance assignment that produced the counter example into a model language (e.g., ALLOY) construct to facilitate subsequent debugging or modification of the formula (block 226). The processing of model analyzer 114 then terminates at block 230 with checker 122 outputting (e.g., to result file 132 and/or a display device among user interface devices 108) the counter example instance expressed in terms of the modeling language construct employed to express formula Phi.

Figure 4B:
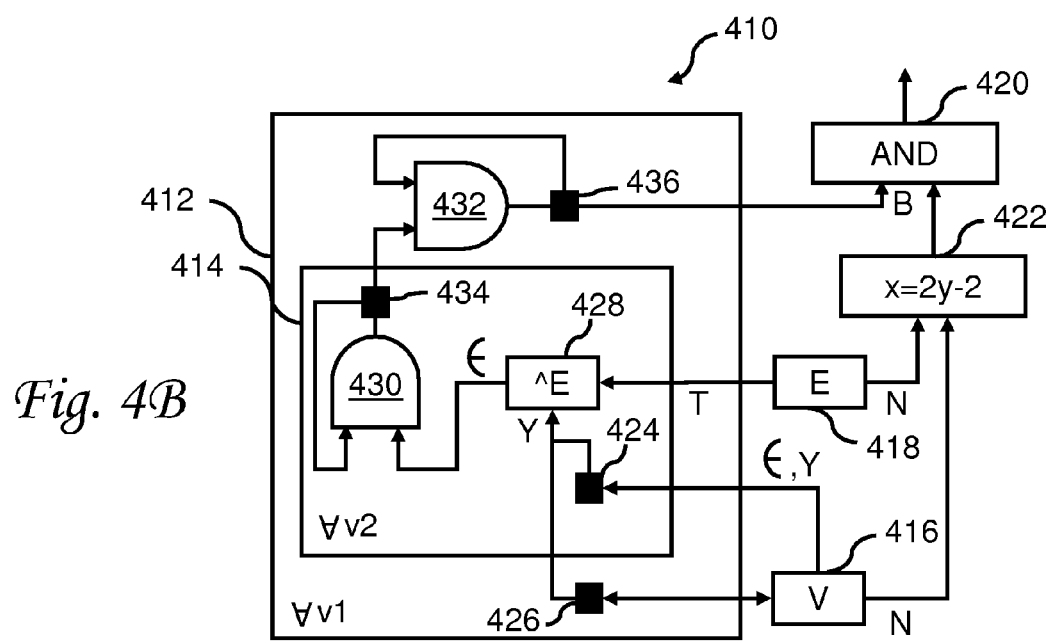
FIG. 4B is a diagram of an SERA representation of the ASG of FIG. 4A.
Figure 4A:
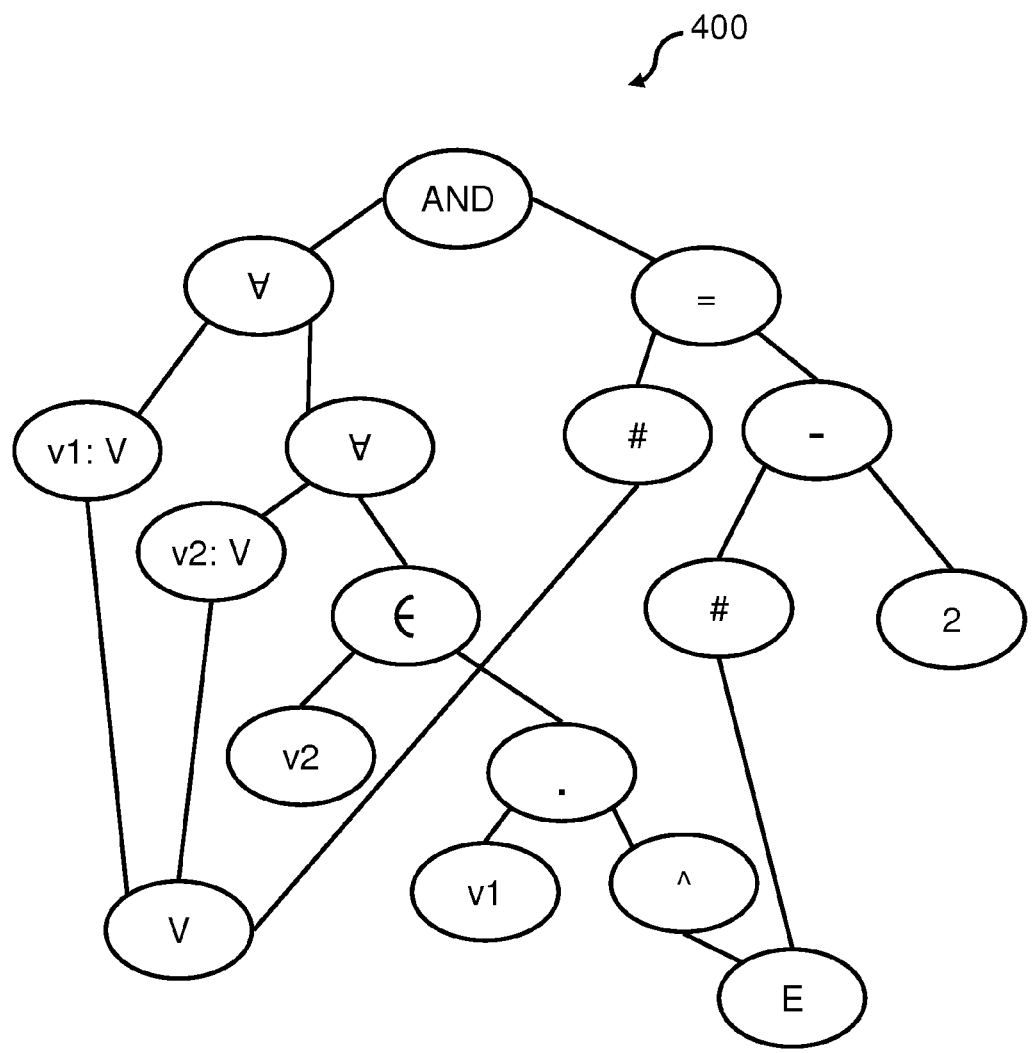
FIG. 4A illustrates an example of an Abstract Syntax Graph (ASG) of an exemplary system modeling formula in accordance with the present invention.
Figure 4C:
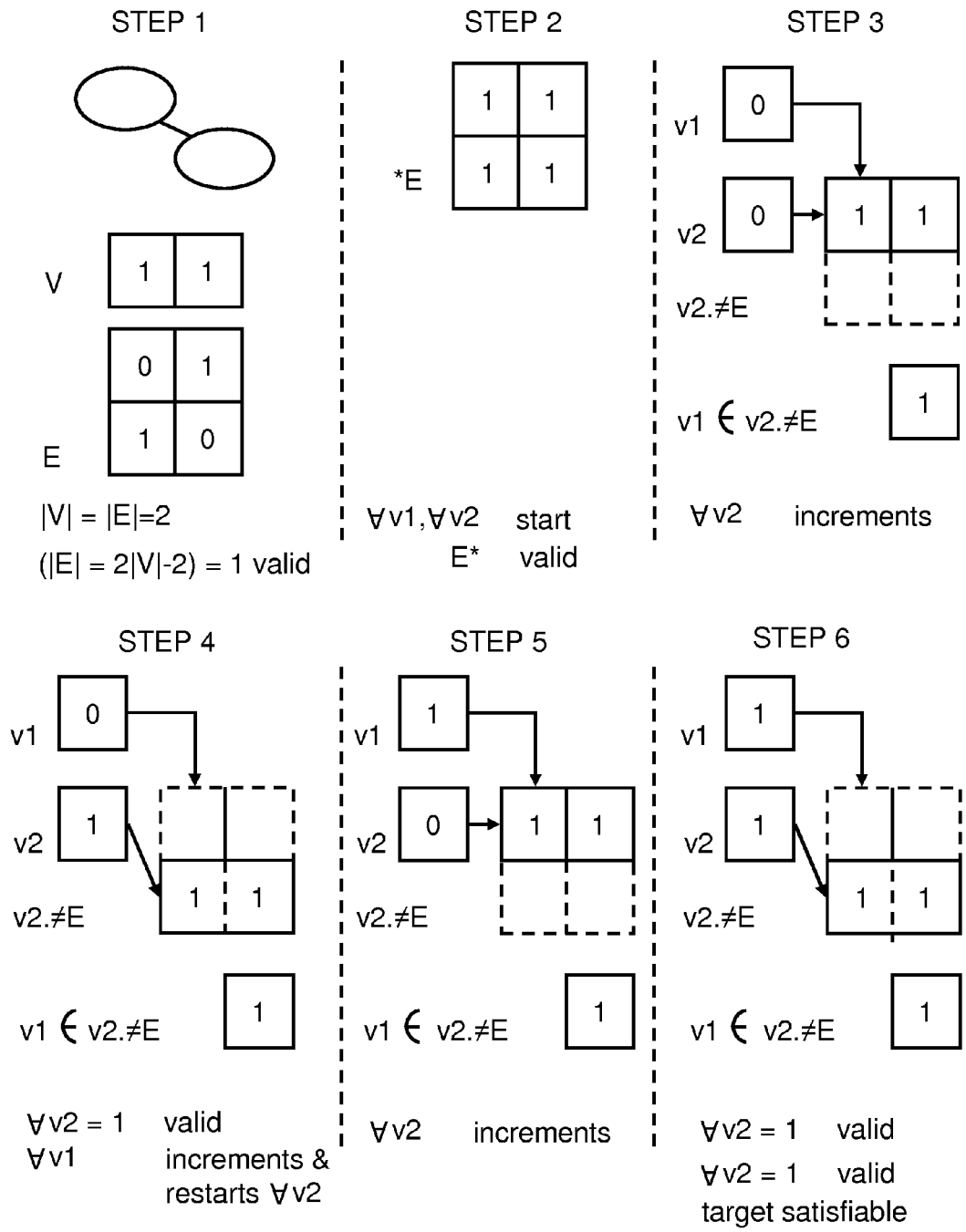
FIG. 4C depicts a trace of the evaluation of the exemplary SERA representation given in FIG. 4B.

To promote a greater understanding of the present invention, the process depicted in FIGS. 2A-2B is now further described for an exemplary formula Phi with reference to FIG. 4A-4C. Referring first to FIG. 4A, there is depicted an abstract syntax graph (ASG) 400 for the exemplary ALLOY predicate:

(forall v1, v2 in V (v2 in v1.*E)) AND (#E=#V+#V−2)

where the "#" operator indicates cardinality and "*" indicates transitive closure. In building ASG 400 as described at block 204 of FIG. 2A, parser 116 of model analyzer 114 begins with the AND node and then computes the nodes representing the two sub-formulas rooted at this node. In the resulting ASG 400, edge nodes represents operands and constants (e.g., V, E, v1, v2 and 2), and internal nodes represent operations. As noted above, when constructing ASG 400, if parser 116 determines that a given component (e.g., V) was previously instantiated, parser 116 connects to the extant node appropriately rather than creating a new node.

Utilizing the principles described in detail above, encoder 118 then encodes ASG 400 as sequential logic expressed in C++. For example, the sequential logic can be expressed as follows:

```
typedef Sig<2> S1;
typedef S1::iter S1Var;
S1 V;
Relation<S1,S1> E;
```

-continued

```
TClosure<S1,S1> Et(E);
S1Var v2, v1;
Product P(v1, Et);
Belongs B(v2, P);
ForAll<S1> A1(v1, V, B);
ForAll<S1> A2(v2, V, A1);
IntPlus P1(V, V);
IntMinus M1(P1, 2);
IntEqual E1( M1, E);
And A3(A2, E1);
```

In this exemplary code, the constructor of each SERA component initializes its references appropriately and adds itself to the global vector of components (e.g., compVec). Classes Sig, Relation, TClosure, Product, Belongs, ForAll, IntPlus, IntMinus, IntEqual, and And all inherit from Component and each implements the ALLOY construct its name suggests.

Referring now to FIG. 4B, there is depicted a diagram of the sequential logic 410 resulting from the compositional encoding of the ASG of FIG. 4A in accordance with blocks 206-212 of FIG. 2A. In sequential logic 410, the "all" statements ∀v1 and ∀v2 are represented by quantifier components 412, 414, respectively, which enclose their bodies and bind the variables. External to quantifier components 412, 414 are V component 416 and E component 418, respectively representing the V and E variables of the exemplary formula, as well as an AND component 420 and equality component 422 representing the second half of the formula. Connected to the membership outputs of V component 416 are register elements 424 and 426, which index the members of V. The outputs of registers 416 and 424 are concatenated to connect appropriately to the index input Y of transitive closure component 428. Utilizing AND gates 430 and 432, ALL components 412 and 414 also accumulate the membership results of the transitive closure in registers 434 and 436 and flag validity once a result is available. Assuming a scope of 2, only one indexing register 434, 436 is needed for each of quantifier components 412, 414.

The cardinality (N) outputs of V component 416 and E component 418 are connected to equality component 422. Finally the predicate outputs B of equality checker 422 and the quantifier components are passed as operands to AND component 420, whose output predicate output is designated as the target.

In FIG. 4B, validity and control inputs and state bits are not shown for clarity. The validity of inner quantifier 414 initializes and executes outer quantifier 412, which in turn executes AND component 420 when ready.

With reference to FIG. 4C, there is depicted a representation of a trace of the execution by checker 122 of a consistent instance of the exemplary predicate "(forall v1, v2 in V (v2 in v1.*E)) AND (#E=#V+#V−2)" with a scope of 2 for sequential logic 410 depicted in FIG. 4B. Step 1 shows the graph instance and the V and E encodings. The initial values of the membership state of V component 416 is mapped as two vertices of type V, and the initial values of the membership state of E component 418 is mapped as the existence or absence of arcs with label E between the vertices. V is initialized to indicate the existence of both members, and E is initialized to indicate the edge in the graph. The membership and cardinality states of V and E are valid immediately since they correspond to the initial state set by the primary inputs. Thus, #E=#V+#V−2 is true and valid immediately.

In Step 2 the quantifiers "forall v1" and "forall v2" are executed, as well as the transitive closure on E. Since quantifier components 412, 414 depend on *E, quantifier components 412, 414 must wait for transitive closure component 428 to signal membership validity. Fortunately, for this example, this happens in 1 step since, transitive closure takes lg(n) steps to complete, where n is the scope.

In Step 3, the relational product v2.*E is executed and returns a vector that is immediately tested for membership of v1. Since all data is valid, the "forall v2" quantifier component 414 updates its predicate state bit and increments its index v2. The same happens in Step 4, and now "forall v2" quantifier component 414 has completed execution and thus can signal the validity of its predicate. The "forall v1" quantifier component 412 updates its predicate state, increments its index v1, and initializes the "forall v2" quantifier component 414 to start execution again.

Step 5 is similar to Step 3, and Step 6 witnesses the completion of execution of the "forall v1" quantifier component 412. The propositional AND component 420 has now two true inputs with valid data so it evaluates to 1, and thus, the target is satisfiable.

As has been described, the present invention provides a method, system and program product that, responsive to receiving a formula describing a model in a high level modeling language, encodes the formula as sequential logic. As will be appreciated, the sequential logic encoding of the present invention differs from techniques used in monitor circuits and high performance sequential synthesis in that, while they match a set of strings to an expression, the present invention produces all matching assignments of a formula within a given scope. A SERA component representing a set or a relation provides an easy implementation of membership and cardinality and allows parallel access to both when the component is in a valid state. The sequential logic is transformed into a gate-level netlist and then, with any possible simplification of the netlist, the target is checked for a counter example.

While the invention has been particularly shown as described with reference to a preferred embodiment, it will be understood by those skilled in the art that various changes in form and detail may be made therein without departing from the spirit and scope of the invention. For example, although aspects of the present invention have been described with respect to a data processing system executing program code that directs the functions of the present invention, it should be understood that present invention may alternatively be implemented as a program product for use with a data processing system. Such program products comprise a computer readable medium in which program code is encoded. Program code defining the functions of the present invention can be delivered to a data processing system via a variety of computer readable media, which include, without limitation, non-rewritable storage media (e.g., CD-ROM), rewritable storage media (e.g., a floppy diskette or hard disk drive), and communication media, such as digital and analog networks. It should be understood, therefore, that such computer readable media, when carrying or encoding program code that directs the functions of the present invention, represent alternative embodiments of the present invention.

What is claimed is:

1. A method of data processing to verify a software system, said method comprising:
  in response to receiving a description of a software system described utilizing a high-level first-order relational modeling language, a data processing system parsing said description and constructing an abstract syntax graph;
  the data processing system transforming the abstract syntax graph into a sequential logic representation of the software system, wherein said transforming comprises transforming said abstract syntax graph into a sequential logic representation by reference to a Hardware Description Language (HDL) library;
  further transforming said sequential logic representation into a gate-level sequential logic representation;
  following the transforming into a gate-level sequential logic representation, the data processing system verifying the software system based upon the gate-level sequential logic representation; and
  the data processing system outputting results of verification of the software system.

2. The method of claim 1, wherein the high-level first-order relational modeling language is Alloy.

3. The method of claim 1, wherein said verifying includes:
  generating a counter example; and
  in response to generation of the counter example, transforming an instance assignment from the counter example into a construct of the high-level first-order relational modeling language.

4. The method of claim 1, wherein said constructing comprises constructing the abstract syntax graph including a plurality of nodes, said plurality of nodes including at least one edge node representing an operand and at least one internal node representing an operation, and wherein at least one edge node is logically connected to multiple internal nodes.

5. The method of claim 1, said step of transforming the abstract syntax graph into a sequential logic representation of the software system including representing a conjunction of all constraints of the model as a signal in the sequential logic representation.

6. The method of claim 1, and further comprising:
  storing in the HDL library a respective generic parameterized sequential logic component for each of multiple constructs of the high-level first-order relational modeling language.

7. The method of claim 1, wherein the method further comprises synthesizing the sequential logic representation into a Hardware Description Language (HDL) netlist representation having an asserted signal as an invariant; and the verifying includes verifying the HDL netlist representation.

8. A program product, comprising:
  a tangible computer readable storage medium; and
  program code with the tangible computer readable storage medium that causes a data processing system to perform:
  in response to receiving a description of a software system described utilizing a high-level first-order relational modeling language, parsing said description and constructing an abstract syntax graph;
  transforming the abstract syntax graph into a sequential logic representation of the software system, wherein said transforming comprises transforming said abstract syntax graph into a sequential logic representation by reference to a Hardware Description Language (HDL) library;
  further transforming said sequential logic representation into a gate-level sequential logic representation;
  following the transforming, verifying the software system based upon the gate-level sequential logic representation; and
  outputting results of verification of the software system.

9. The program product of claim 8, wherein the high-level first-order relational modeling language is Alloy.

10. The program product of claim 8, wherein said verifying includes:
  generating a counter example; and
  in response to generation of the counter example, transforming an instance assignment from the counter example into a construct of the high-level first-order relational modeling language.

11. The program product of claim 8, wherein said abstract syntax graph includes a plurality of nodes, said plurality of nodes including at least one edge node representing an operand and at least one internal node representing an operation, and wherein at least one edge node is logically connected to multiple internal nodes.

12. The program product of claim 8, wherein transforming the abstract syntax graph into a sequential logic representation of the software system includes representing a conjunction of all constraints of the model as a signal in the sequential logic representation.

13. The program product of claim 8, wherein the program code further causes the data processing system to perform:
  storing in the HDL library a respective generic parameterized sequential logic component for each of multiple constructs of the high-level first-order relational modeling language.

14. The program product of claim 8, wherein:
  the program code further causes the data processing system to perform synthesizing the sequential logic representation into a Hardware Description Language (HDL) netlist representation having an asserted signal as an invariant; and
  the verifying includes verifying the HDL netlist representation.

15. A data processing system, comprising: processing resources; and data storage coupled to the processing resources and including program code that, when processed by the processing resources, causes the data processing system to perform:
  in response to receiving a description of a software system described utilizing a high-level first-order relational modeling language, parsing said description and constructing an abstract syntax graph;
  transforming the abstract syntax graph into a sequential logic representation of the software system, wherein said transforming comprises transforming said abstract syntax graph into a sequential logic representation by reference to a Hardware Description Language (HDL) library;
  further transforming said sequential logic representation into a gate-level sequential logic representation;
  following the transforming, verifying the software system based upon the gate-level sequential logic representation; and
  outputting results of verification of the software system.

16. The data processing system of claim 15, wherein the high-level first-order relational modeling language is Alloy.

17. The data processing system of claim 15, wherein said verifying includes:
  generating a counter example; and
  in response to generation of the counter example, transforming an instance assignment from the counter example into a construct of the high-level first-order relational modeling language.

18. The data processing system of claim 15, wherein said abstract syntax graph includes a plurality of nodes, said plurality of nodes including at least one edge node representing an operand and at least one internal node representing an operation, and wherein at least one edge node is logically connected to multiple internal nodes.

19. The data processing system of claim 15, wherein transforming the abstract syntax graph into a sequential logic representation of the software system includes representing a conjunction of all constraints of the model as a signal in the sequential logic representation.

20. The data processing system of claim 15, wherein the program code further causes the data processing system to perform:
  storing in the HDL library a respective generic parameterized sequential logic component for each of multiple constructs of the high-level first-order relational modeling language.

21. The data processing system of claim 15, wherein;
  the program code further causes the data processing system to perform synthesizing the sequential logic representation into a Hardware Description Language (HDL) netlist representation having an asserted signal as an invariant; and
  the verifying includes verifying the HDL netlist representation.

* * * * *